(12) United States Patent
Rasmussen

(10) Patent No.: US 7,976,925 B2
(45) Date of Patent: Jul. 12, 2011

(54) CROSS-LAMINATE OF ORIENTED FILMS, METHOD OF MANUFACTURING SAME, AND COEXTRUSION DIE SUITABLE IN THE PROCESS

(75) Inventor: Ole-Bendt Rasmussen, Walchwil/Zug (CH)

(73) Assignee: Ole-Bendt Rasmussen

( * ) Notice: Subject to any disclaimer, the term of this patent is extended or adjusted under 35 U.S.C. 154(b) by 0 days.

(21) Appl. No.: 10/506,419

(22) PCT Filed: Mar. 3, 2003

(86) PCT No.: PCT/EP03/02827
§ 371 (c)(1),
(2), (4) Date: Sep. 2, 2004

(87) PCT Pub. No.: WO03/074264
PCT Pub. Date: Sep. 12, 2003

(65) Prior Publication Data
US 2005/0095411 A1    May 5, 2005

(30) Foreign Application Priority Data

Mar. 4, 2002 (GB) .................................. 0205021.9
Sep. 20, 2002 (GB) .................................. 0221961.6
Oct. 21, 2002 (GB) .................................. 0224447.3

(51) Int. Cl.
*B32B 5/12* (2006.01)
*B32B 7/02* (2006.01)
(52) U.S. Cl. .................. 428/107; 156/163; 264/173.12; 428/34.8; 428/105; 428/110; 428/167; 428/198

(58) Field of Classification Search .................. 428/107, 428/105, 110, 167, 196, 198, 34.8; 156/163; 264/173.12
See application file for complete search history.

(56) References Cited

U.S. PATENT DOCUMENTS

| | | | | |
|---|---|---|---|---|
| 2,851,389 A * | 9/1958 | Lappala | ........................ | 428/220 |
| 3,340,128 A * | 9/1967 | Johnston | ........................ | 156/426 |
| 3,687,764 A * | 8/1972 | Frogosch et al. | ............. | 156/179 |
| 4,039,364 A * | 8/1977 | Rasmussen | ................... | 156/164 |
| 4,087,577 A * | 5/1978 | Hendrickson | ................. | 428/110 |
| 4,454,184 A * | 6/1984 | Britton | ........................ | 428/110 |
| 5,328,743 A * | 7/1994 | Wynne et al. | ................. | 428/105 |
| 5,614,297 A * | 3/1997 | Velazquez | ..................... | 428/212 |
| 6,204,207 B1 * | 3/2001 | Cederblad et al. | ................ | 442/5 |
| 6,299,966 B1 * | 10/2001 | Bonke et al. | .................. | 428/173 |

* cited by examiner

*Primary Examiner* — Brent T O'Hern
(74) *Attorney, Agent, or Firm* — Robert W. Strozier (57) ABSTRACT

New cross-laminates are formed of films of which at least two are uniaxially or unbalanced biaxially oriented, in which the main direction of orientation in one of these films crosses the main direction of orientation in the other one, having modifications, made in a suitable pattern, of the surface properties of the two films on the surfaces which are inside the laminate and are bonded to each other. The internally arranged surface layers of the films comprise an array of strands (101, 102) of coextruded material and the films are arranged so that the arrays of the two films cross one another. The strands may be used to control adhesion between the films and reduce the tendency to delaminate on repeated flexing, making a laminate suitable for use as a tarpaulin. Alternatively, especially in combination with provision of embossment of at least one of the films whose main layer is transparent to form striations (103), colored strands may confer interesting visual effects on the laminate viewed from the side of that film which may make the laminate appear thicker than it actually is.

24 Claims, 6 Drawing Sheets

CROSS-LAMINATE OF ORIENTED FILMS, METHOD OF MANUFACTURING SAME, AND COEXTRUSION DIE SUITABLE IN THE PROCESS

RELATED APPLICATIONS

This application claims priority to U.S. Provisional Patent Application Serial No. 60/836,075, filed 7 Aug. 2006 (Aug. 7, 2006). PCT Filed: Mar. 3, 2003 PCT NO: PCT/EP03/02827.

BACKGROUND OF THE INVENTION

1. Field of the Invention

The present invention concerns crosslaminates, i.e. laminates of films of which at least two are uniaxially or unbalanced biaxially oriented, in which the main direction of orientation in one of these films crosses the main direction of orientation in the other one.

More specifically the invention concerns modifications, made in a suitable pattern, of the surface properties of the two films on the surfaces which are inside the laminate and are bonded to each other. There are two different practical purposes of making such pattern formed modifications.

2. Description of the Related Art

One well known modification of internal surfaces in a laminate (although not actually used for crosslaminates) consists in printing a text or decorative pattern on one of the surfaces which become internal. Thus the text or pattern cannot be rubbed off the laminate during use.

One aspect of the invention is an improvement of this method, but limited to decorative, sales promoting patterns of crisscrossing colored bands by which the relatively expensive printing process is substituted by a low cost modification of the extrusion process. Furthermore a special embodiment of this aspect of the invention gives very special three-dimensional effect as it shall be described later.

As regards the importance of visual effects in products made of plastics, reference is made to an article in Modern Plastics December 2002, pg. 50: "Visual Effects means Business", which states "(i)nstead of considering an exterior simply as a cover for components, manufacturers are using it as a marketing tool to differentiate products and allow personalisation".

Modifications of the internal surfaces in a crosslaminate, made in a suitable pattern, can also, as it has been proposed, be used to improve the tear propagation resistance. This shall now be dealt with in detail, and in that connection a general explanation of the known crosslamination technology will be useful. Also for this aspect of the invention, the main purpose of the invention is to substitute relative expensive or less efficient process steps by a low cost modification of the extrusion method.

Cross-laminates of oriented films from synthetic polymer materials have been commercially produced since 1968, then mainly as described in the inventor's patent GBA-0 792,976 of May 23, 1955. To the inventor's knowledge the total annual worldwide production today amounts to about 30,000 tons. The cross-laminate is used in particular as industrial bags, coversheet, tarpaulins, pond-liners and similar products.

The polymer materials used for these cross-laminates have been mainly and are mainly polyethylene and polypropylene of different types, often modified by blending, and the old and present manufacturing processes comprise the steps of extruding a tube, which, by the draw-down, is oriented mainly in its longitudinal direction, helically cutting this tube to a web with its main direction of orientation on the bias, and continuously laminating two or more such webs with their main directions of orientation crisscrossing. There can also be included in the laminate a film which is oriented mainly in its longitudinal direction.

In the first commercialised technology based on these principles, the extruded tubular film, which is melt-oriented mainly in its longitudinal direction, is further cold stretched in this direction prior to the helical cutting. In a later commercialised technology, disclosed e.g. in U.S. Pat. No. 4,039,364 (Rasmussen), each tubular film is coextruded, having a layer which contributes mainly to the tensile strength in the laminate (hereinafter "the main layer") and at least one surface layer (hereinafter "the first bonding layer") adapted to help in the bonding of the films, which at least partly takes place by pressure and heat.

Also special layers are coextruded on the films, which become exterior in the laminate. These special layers are adapted to modify the surface properties of the laminate, especially for improved heat-sealing. In this later technology the helical cutting takes place in direct succession to the coextrusion without any cold stretching between, but in a separate production line. However, further stretching is carried out when the films have been brought together in a sandwich arrangement, bonded or not yet bonded to form a laminate. The films are biaxially stretched at a relatively low temperature.

The transverse component of this biaxial stretching takes place between grooved rollers.

In U.S. Pat. No. 5,028,289 (Rasmussen) and U.S. Pat. No. 5,626,944 (Rasmussen) this stretching between grooved rollers has been further developed.

Practical ways of carrying out the helical cutting are disclosed in U.S. Pat. No. 5,248,366 (Rasmussen). This patent also mentions an alternative cutting technique, namely that the tubular film can be provided with a helically extending melt orientation while it is drawn off from the coextrusion die, established by a relative rotation between the exit and the die, and subsequently the cutting may be parallel with the axis or may be at an angle to the main direction of orientation. The process may even be adjusted to produce a web in which the main direction of the melt orientation will become perpendicular to the longitudinal direction of the web.

For the sake of completeness it should also be mentioned that, in very early patents, there is also disclosed the possibility that longitudinally orientated polymer film material can be discontinuously cross-laminated and bonded in a press.

In a process which is entirely different from that described above, cross-laminates of a very stiff character are made for use in special, advanced products. They consist of polymers which in molten or part-molten state are fluid crystals, and which become oriented and cross-laminated already within the extrusion die by means of counter-rotating dieparts. However, this type of process and product is not a subject of the present invention.

Reverting to the other type of cross-laminates, which more commodities or technical products, they are especially characterized by high puncture strength and high tear propagation resistance. The heat-seal strength in a shear-type seal is adequate when a suitable lower melting polymer has been chosen for the surface layers of the laminate, while very special precautions must be taken if good shock-heat-seal strength is requested in peel-type heat-seals, as usually needed for industrial bags supplied with such heat-seals. These precautions are disclosed in the inventor's patent publications U.S. Pat. No. 5,205,650 and WO-A-98/23434.

As mentioned above the cross-laminates can exhibit a particular high tear propagation resistance, however this is under the condition of a generally low bonding strength. Due to the unbalanced orientation in the individual films and the crisscrossing of the main directions of the orientation, one film will have a tendency to propagate the tear in one direction and another film will tend to propagate the tear in another direction. Thereby there will be a tendency to eliminate the bonding at the location where the forces are concentrated, and if this tendency is sufficiently pronounced, the tear will "fork out" under a local delamination, and the "notch effect" of the tearing will almost be eliminated.

Hereby there will, generally speaking, be "competition" between the adhesive forces which try to withstand delamination, and the cohesive forces in each film which try to avoid a rupture or flow along any direction which is not parallel with the main direction of orientation. The said adhesive forces are (still generally speaking) independent of the thickness of the films, while the said cohesive forces are mainly proportional to the film thickness, when all other parameters are unchanged. As a consequence of this "competition", "thin" crosslaminates will either exhibit a relative poor tear propagation resistance or a relatively high tendency to delamination. This is much less of a problem for crosslaminates of "thick" layers. For bags this "competition" will usually not cause any problems since filled bags are usually not subjected to delaminating forces, which means that a low bonding strength can be chosen, but the matter is very important for tarpaulins, cover sheets and similar products which will be subjected to repeated flexing during use, e.g. will flap in the wind. As a matter of practical experience the inventor and his licensees have found that in a tarpaulin made from a two-film crosslaminate based on combinations of LLDPE- and HMWHDPE-types, each of the films must be of a gauge of at least 45-50 $gm^{-2}$, otherwise either the bonding strength or the tear propagation resistance will be unacceptable to the users. These experiences concern tarpaulins for "static" uses where there will not occur much flapping in the wind. For "dynamic" uses such as cover over trucks or goods waggons, where the tarpaulin will be subjected to a strong, repeated flapping, the gauge required is much higher.

One objective of the present invention is to solve this problem, so that high tear propagation resistance and an adequate bonding between the films can be achieved at the same time and in a practical way, even in crosslaminates of low gauge.

In connection with the solution of the above mentioned problem, the inventor has constructed a circular coextrusion die capable of coextruding, in a practical way, an array of strands on a tubular film, and this construction is also an objective of the present invention.

In GB-A-1,095,479 of Mar. 3, 1964 (assigned to Metal Containers) the inventor suggested that the problem which has been identified above, can be solved by strongly welding the films to each other in spots or lines and weakly welding them together over the rest of the contacting surfaces (a strong bond/weak bond generally being better than a strong bond/no bond). This enables the tear to "fork-out" as described above in the weak-bond areas, while an overall delamination is prevented by the strong-bond spots or lines.

For the strong welding, the patent suggests heating, ultrasonic welding, application of a solvent (preferably hot vapours) to dissolve a thin surface layer, or using quickly polymerizing monomers acting as strong binders. For the weak welding the patent suggests (using polyethylene crosslaminates as an example) to apply a gel of low molecular weight polyethylene or paraffin wax, which has been dissolved e.g. in toluene or xylene by heating and has formed gel by cooling. A thin layer of this gel including the solvent is selectively applied by printing technique before the strong welding is carried out by blowing vapours of toluene or xylene towards the film surfaces while they become united between rollers. Alternatively there is added a minor amount of a slip agent to toluene or xylene, and this "contaminated" solvent is used in similar manner to the gel.

DK-A-1017/67 (de Pont) published on Feb. 24, 1967 claims crosslaminates of films bonded in spots or lines, (which may be two arrays of lines forming a net pattern) while the rest of the contact area is (quoting the main claim) "practically not bonded". Three methods of carrying out the bonding in spots or lines are disclosed. One consists in applying a caoutchouc-like binder in the desired pattern. This application is said to take place by well known methods, but it is not further explained.

A second method consists in treating the selected areas of a surface on one of the films which chlorine, followed by lamination under pressure at an elevated temperature below the melting point of the film material.

A third method, which is described as being preferred, is carried out by treating the selected areas of a film surface with a corona discharge, followed by lamination under pressure at an elevated temperature under the melting points of the film material. In this case a roller formed electrode, connected to earth, is supplied with the desired pattern (which may be a net-pattern) so that the electrical discharge only takes place in the space determined by this pattern. The matching film surface is corona treated over its entire area. It is indicated that this treatment requires an effect of 20 W $cm^{-1}$ width if the velocity is 0.5 m $min^{-1}$.

In the above-mentioned latter patent U.S. Pat. No. 4,039, 364 (Rasmussen) in which there is coextruded a surface layer on each oriented film ("the first bonding layer") to enhance and control the bonding, a strong bond/weak bond adhesion system is established by using different lamination temperatures at the different locations of the laminate. Thus in example 1, by the use of coextrusion and helical cutting three films are made with different direction of melt orientation and surface layers of EVA to assist the lamination (in the foregoing called "the first lamination layer"). There is established a weak bonding simultaneous with transverse orientation, by taking a sandwich of the three differently oriented films seven times through a set of intermeshing grooved rollers. The pitch of these rollers is 1.5 mm, of which the width of the groove amounts to 1.0 mm and the width of the circular "tooth" to 0.5 mm. Between each passage through grooved rollers, the pleats formed in the film sandwich are straightened out.

These stretching steps take place at 20° C. but still produce some bonding (peel strength 10 g $cm^{-1}$) due to the intimate contact between the films and the effect of stretching them together. After the seven passages at 20° C. the film is passed once through a similar set of grooved rollers with the same dimensions and intermeshing, but heated to 120° C., whereby there is formed lines of strong bonding. Finally the laminate is longitudinally oriented.

In EP-A-0 099 222 (Mercer et al) of Apr. 7, 1983, orientation and crosslamination in a spot-welded pattern is carried out as a unitary process in and immediately following a circular die with two counter rotating dieparts. Each of these dieparts produces a film supplied with an array of ribs, arranged so that the two arrays face each other. Due to the counter-rotation, the melt orientation in and the array of ribs on one of the ribbed films become right-handed and for the other become left-handed. The two arrays of ribs are brought to meet each other at or immediately after the die exit, and bonding takes place only in the spots where the ribs intersect each other. The ribs keep the two spot-welded films spaced apart from each other also in the final product.

Melt-orientation with crisscrossing orientation takes place while the polymer material flows through the two counter-rotating parts and by the blowing and longitudinal drawdown when the laminate has left the exit of the die. There is no subsequent orientation process carried out.

The process is not a coextrusion process. The films and the ribs consist of the same polymer material and come from the same extruder.

To the knowledge of the inventor, none of the above mentioned methods of making strong bond/weak bond or strong bond/no bond adhesion patters in crosslaminates has ever been used for commercial production although the principal, great advantage of such bonding systems in crosslaminates has been recognised for about 40 years. However, each of the proposed methods have serious drawbacks. The methods which make use of organic solvents for polyolefins, especially in vapour form, are connected with health hazards unless very expensive machinery is used, not least because it is difficult to avoid traces of the solvent to remain in the final product.

The proposed corona treatment in a pattern, followed by lamination under pressure and heat but below the melting point of the polymer material, is applicable only if the production capacity is very low. In commercial production of crosslaminates for commodity uses, such as e.g. tarpaulins and cover sheets, the lamination velocity must be about 60 m min$^{-1}$ or more and the width about 150 cm or more. Using the above mentioned information about power consumption, the 60 m min$^{-1}$ and 150 cm will require 900 kW, which of course is not practically possible. Nor is treatment with chlorine in a pattern a process suited for industrial production on a large scale.

The use of binders, applied by printing technique from a dispersion or solution, requires a previous strong surface treatment, when the polymer material is polyethylene or polypropylene, normally a very strong treatment by corona, and therefore this method is not economical either.

A strong bond/weak bond or strong bond/no bond pattern achieved by different temperatures will inevitably create differential shrinkage if the pattern is a line or pattern (including a net pattern), and this makes the crosslaminate look untidy. Differential shrinkage can be avoided if the areas of strong bonding are small dots, but in this case the product gets a dotted appearance which may be unpleasant.

Furthermore the apparatus needed for adequate heating in a spot pattern to a controlled temperature is relatively complicated, when the velocity is high, since the laminate must maintain contact with hot spots on a heater over a long passage without any displacement of the laminate taking place in spite of its tendency to shrinkage.

In the unitary crosslamination process with counter-rotating dieparts it is, from the point of view of strength, a drawback that film forming and molecular orientation are so closely coupled together. This makes it virtually impossible to tailor-make the properties for different purposes. Furthermore the inventor has found that a crosslaminate which is entirely unbonded except in spots, exhibits a relatively low yield point and high tendency to creep in a direction between the main directions of orientation in the two laminated films.

SUMMARY OF THE INVENTION

The aim of the present invention is to provide an improved and simplified strong bond/weak bond system for the crosslaminate by use of extrusion and/or provide it with improved interesting aesthetic effects, by similar co-extrusion.

The invention concerns a crosslaminate comprising mutually bonded polymer films of which at least two neighbor films A and B each being coextruded films are uniaxially oriented or unbalanced biaxially oriented, whereby the main direction of orientation in A crosses the main direction of orientation in B and each contains a layer consisting of a polymer material selected for high tensile strength (hereinafter the main layer) and on each main layer on its side which faces the neighbor film A or B at least a first surface layer. Said first surface layer on each of the films A and B is a discontinuous layer consisting of an array of coextruded thin strands consisting of a material which is selected to modify the properties in the surface of the respective film. This modification concerns either the optical appearance of the laminate or the bonding between A and B.

Accordingly, in the method of manufacturing the crosslaminate of the invention, which laminate comprises the above mentioned films A and B (but there can also be further films in the laminate), A and B are each coextruded in a flat or circular coextrusion die, and each comprises a main layer of a polymer material which is selected for high tensile strength and the above mentioned first surface layer made from a different material. A and B are each supplied with a uniaxial or unbalanced biaxial molecular orientation at any stage after the joining of the different materials in the coextrusion die and before the lamination. Prior to the lamination A and B are arranged in such a way that the main direction of orientation in A will cross the main direction of orientation in B, and during the lamination the bonding between A and B is established at least in part through heat. The characterizing feature of the method is that in the coextrusion each of the said first surface layers is made a discontinuous layer (discontinuous transversely to the direction of extrusion) consisting of an array of strands, and in the lamination the array of strands on the film A are arranged to cross the array of strands on the film B.

The method is further characterized in that the material from which the strands are extruded is selected to modify the properties in the surface of the respective film. This modification concerns either the optical appearance of the laminate or the bonding between the films A and B.

BRIEF DESCRIPTION OF THE DRAWINGS

The invention is illustrated in the accompanying drawings in which:

FIG. 4 is a schematic perspective drawing of coextrusion line for manufacture of tubular film suitable, after helical cutting, for making the crosslaminate shown in FIGS. 1, 2 and 3. The flow of polymer material for the strands comes from a very small extruder (4), and flows of three other polymer materials (for main layer, continuous second surface layer and layer for surface of the laminate) come from the bigger extruders (5), (6) and (7). The last-mentioned three materials are fed into the distribution part (8) of the coextrusion die and are here each formed into a circular flow. Joining of these flows takes place at the exit from (8) while they enter the bodily separate exit part (9). The flow from the small extruder (4) is fed directly into exit part (9) where, starting from the circumference, it becomes evenly distributed in a labyrinthine channel system as shown in FIG. 6 and applied through a circular array of internal orifices on the outside of the tubular joint flow of the other components. The concept of the labyrinthine channel system is explained above.

DETAILED DESCRIPTION OF THE INVENTION

The inventor has found that a crosslaminate comprising mutually bonded polymer films of which at least two neighbor films A and B each being coextruded films are uniaxially oriented or unbalanced biaxially oriented can be prepared, whereby a main direction of orientation in A crosses a main direction of orientation in B. The inventor has also found that each film A and B contains a layer comprising a polymer material selected for high tensile strength (hereinafter the main layer) and on each main layer on its side which faces the neighbor film A or B at least a first surface layer. The first surface layer on each of the films A and B is a discontinuous layer comprising an array of coextruded thin strands comprising a material which is selected to modify the properties in the surface of the respective film. This modification concerns either the optical appearance of the laminate or the bonding between A and B. The aspect of the invention which concerns the bonding properties and aims at improved tear propagation resistance, is further characterized in that A and B are strongly bonded to each other in each spot (a) where a strand (101) on the film A intersects with a strand (102) on the film B, while A and B are weaker bonded or not bonded over the parts (b) of their contacting surfaces, which are devoid of any first bonding layer, while further characterization of the method for this purpose in that in the lamination the heat is applied generally evenly all over the films A and B the selection of polymer materials is adapted to make the strands on the film A strongly bond to the strands on the film B in the spots (a) where they intersect the latter but make a weaker bonding or avoid bonding over the parts of the contacting surfaces, which are devoid of any first bonding layer. The aspect which concerns the optical appearance and has decorative aesthetic purposes, is further characterized in that the modification of optical appearance is established through a selection of pigmentation in the first surface layer.

Preferable dimensions of the product crosslaminate can be characterized in that the thickness of the strands in each of the films A and B amounts at the highest to 30%, preferably at the highest 20% and still more preferably no more than 10% of the thickness of the respective film. The crosslaminates can be characterized in that the width of the strands in each of the films is selected to occupy at the highest 60%, preferably at the highest 50% and still, more preferably at the highest 30% of the surface area of the respective film. The crosslaminates can be characterized in that the thickness increase in each of the films A and B at the locations where the strands are coextruded amounts at the highest to 30% seen relative to the immediate surrounding, preferably at the highest 20% and still more preferably no more than 10%. The crosslaminate can be characterized in that the distance from middle to middle of neighbor strands in each array is between 2 mm and 80 mm, preferably no higher than 40 mm, and more preferably no higher than 20 mm.

As a comment on the need for interesting decorative effects, it is the experience of the inventor that the raw material saving which can be achieved by use of crosslaminated film, often from a commercial point of view is offset by negative subjective judgements. As an example agricultural tarpaulin (e.g. for protection for crops) made from a 70 g m$^{-2}$ crosslaminate of oriented polyethylene films would be a fully adequate substitute of a 100 g m$^{-2}$ tarpaulin made from extrusion-coated woven tape, if only objective criteria were applied.

However, in actual fact the average customer to agricultural tarpaulins makes his choice to a great extent on the basis of the handle and the appearance, and will reject the 70 g m$^{-2}$ tarpaulin due to its flimsiness and its appearance as a simple plastic film. The problem of flimsiness is reduced by application of the inventor's earlier invention described in WO-A-9314928, which briefly is explained below in connection with one of the special embodiments of the present invention, while the problem of appearance as a simple plastic film is still outstanding. However it is believed that the pattern of crisscrossing strands in the present invention will convey the message that this is a crosslaminate and therefore of special strength. In this connection it can be seen by the user that the pattern clearly is not printed on the surface of the laminate but is inside it. The slightly blurred delineation of the pattern, which is an inherent result of the coextrusion technique, shows that the lines come from the film manufacture and not from a later printing on one or more plies. All in all the pattern indicates that this is a crosslaminate and therefore can be expected to be strong. Furthermore the pattern will of course be unaffected by abrasion, whereas a pattern printed on the laminate is very susceptible to such actions.

A large proportion of the crosslaminated film which is manufactured worldwide, has been stretched transversely by passage between one or more sets of intermeshing grooved rollers, see, for instance, the above mentioned WO-A-9314928 which describes the existing technique in connection with crosslaminated films. This transverse stretching process will always give the crosslaminate a more or less striated appearance due to surface corrugations with corresponding thickness variations in the laminate. A fine pattern of variations even as small as +/−5% becomes very visible due to reflections of light. The inventor has now surprisingly found that the combination of this striated pattern with colored strands inside the laminate produces a pronounced three-dimensional effect. Besides being an interesting effect which can attract curiosity it also makes the observer feel that the laminate is much thicker than it really is, and thereby it counteracts the negative subjective judgement that this is simple plastic film. This special three-dimensional effect is further dealt with below.

In the coextrusion process, A and/or B are preferably also supplied with a continuous surface layer (hereinafter the second bonding layer) which for the purpose of the decorative aspect can be coextruded either on top of the array of strands or under the latter. For the purpose of the bonding aspect the second bonding layer is coextruded on the main layer under the array of strands, whereby the composition of the second bonding layer is different from the composition of the main layer and of the first bonding layer. Further for the purpose of the bonding aspect the second bonding layer is selected to produce, during the lamination, bonding also at locations which are devoid of any first bonding layer, having a lower strength than the bonding in the spots.

The method according to the present invention and the product made by this method do not suffer from any of the draw-backs mentioned above. The method is very suited for commercial manufacture of commodity products, as there are no health hazards involved; the extra costs compared to the lamination with an even bonding all over is negligible; extrusion, stretching and laminating are in essence separate process steps so that each can be optimised for the desired end use; the appearance of the product need not suffer from the effect of differential shrinkage or a dotted appearance; and commonly used machinery for manufacture of crosslaminates can be used with only inexpensive additions to existing coextrusion lines, as shall be explained below.

For optimisation of the bonding pattern, a very important advantage is that the pattern of lamination can comprise not only two, but three elements, provided the coextrusion apparatus comprises the means for extruding the mentioned second bonding layer. The coextrusion apparatus with said means may not always be used to extrude this layer.

These three elements in the pattern of lamination are:
a) each spot where two strands of first bonding layers intersect each other,
b) each area in which both contacting surface parts are devoid of any first bonding layer, and
c) the areas in which there is first bonding layer on one of the two contacting surfaces and no first bonding layer on the other one.

Components a) and c) together form the net pattern.

By adapting the bonding strength of components a), b) and c) differently for different uses, but using the same machinery, this bonding system can be very helpful for tailoring the properties of the crosslaminate.

Thus, as an example, there are certain tarpaulin-like uses where the gauge should be brought down as much as possible for cost reasons, but where tear propagation strength and ultimate tensile strength are of primary importance, and yield tension and aesthetics are of relatively low importance, but where the resistance to delamination must be very high due to flapping in the wind. In that case a strong bond/no bond pattern is preferable, and the coextrusion of a second bonding layer is omitted. The main component may be applied not only from its own extruder and through its own channel system, but also from the extruder and through the channel system which otherwise is used for the second bonding layer. The bonding is established as a strong welding in the spots (a) where the strands intersect each other.

In other cases there can be a need to establish a strong bonding not only in the spots (a) but also in the areas (c), while there should be some bonding, but a pronouncedly weak bonding in the areas (b).

This can also be achieved by a suitable choice of polymer materials for the first and second bonding layers (in this case the second bonding layer must of course be applied). The combination of strong bonding in a net pattern, and some but weak bonding over the rest of the area produces a very interesting pattern of lamination, usually better than strong spot-welding combined with weak bonding over the rest. In the last mentioned case, an accidentally started delamination will generally propagate over a wide area if the crosslaminate is repeatedly flexed, e.g. when it is flapping in the wind. The films will still be held together where they are spot-welded, but the rest will become unbonded and thereby loose the aesthetics and to some extent the yield strength and creep resistance.

In contrast, a weak bonding surrounded by strong bonding in net pattern, will not be allowed to propagate an accidental delamination in such a manner.

However, it should be mentioned that there also exist applications in which the best combination is:
(a) strong welding;
(b) weak bonding; and
(c) also weak bonding, but stronger than (b).

Preferably each of the two films A and B should mainly consist of polyethylene or polypropylene, e.g. the main layer can advantageously consist of HDPE or LLDPE or a blend of the two, the second bonding layer mainly of LLDPE but with admixture of 5-25% of a copolymer of ethylene having a melting point or a melting range within the temperature interval 50-80° C., while the strands mainly can consist of a copolymer of ethylene having a melting point or a melting range within the temperature interval 50-100° C. or a blend of such copolymer and LLDPE containing at least 25% of the said copolymer.

The distance from middle to middle of neighbor strands in each array should normally be between 2 mm and 8 cm, preferably no higher than 4 cm, and more preferably no higher than 2 cm.

The bonding strength in the spots (a) as measured by peeling (carried out on narrow specimens at a velocity of about 1 mm s$^{-1}$) should normally be at least 40 g cm$^{-1}$ and the bonding strength in areas (b) similarly determined at the highest 75%, but preferably no more than 50% of the bonding strength in (a).

Unlike the crosslaminate made with counter-rotating dieparts and comprising criss-crossing arrays of ribs, mentioned above in the prior art description, the increase in thickness in each of the films A and B at the locations where the strands are coextruded, should normally amount to at the highest 30% seen relative to the immediate surrounding locations, preferably at the highest 20% and still more preferably no more than 10%.

The coextrusion of one or both films A and B is preferably carried out by means of a circular coextrusion die, to form and draw-down a tubular film.

The draw-down is adapted to produce a significant uniaxial or unbalanced biaxial melt-orientation with the main direction of orientation and the direction of the array of strands along the longitudinal direction of the film. Alternatively, the orientation and the direction of the array can be made to extend helically along the tubular film by means of a relative rotation between the exit of the die and the means to take up the film after the extrusion. Subsequently the film is cut open under an angle to the main direction of orientation and to the direction of the array.

The distance from middle to middle of neighbor strands at the exit from the extruder should normally be at the highest 8 cm, preferably no higher than 4 cm and more preferably no higher than 2 cm, and the circumference of the tube at this exit should normally be at least 20 cm.

It is also within the scope of the invention to extrude both films A and B from a flat die and cross-web the films under use of a hot press, preferably after longitudinal cold-stretching of both.

The crosslaminate of the present invention is not necessarily limited to the two films A and B, but can comprise three or more layers. Thus as an advantageous construction, it may comprise two pairs of array-bonded films A and B, especially in the arrangement A-B-A or B-A-B in which the middle film has on both of its surfaces an array of strands, i.e. a first bonding layer and preferably also a second bonding layer.

In another suitable arrangement comprising more than two films A and B there is additionally applied at least one more film in the lamination. Said film is also produced by coextrusion and is thereby provided with a surface layer of a composition adapted to control its bonding in the laminate. This composition and the lamination conditions are chosen such that the strength of this bonding is higher than the bonding strength between A and B at the locations which are devoid of the coextruded strands. Thus a delamination of the additional film is counteracted.

The surfaces of the laminate should preferably each consist of a layer adapted to improve the heat-sealing properties of the laminate and/or increase its frictional properties. Such layers are coextruded in the films used as outer films in the laminate.

Normally the molecular orientation in each film A and B, which may be uniaxial or unbalanced biaxial orientation, should not be limited to that achieved in connection with the extrusion. There may be carried out a further longitudinal stretching prior to the helical cutting. Alternatively or supplementary, the films may be further oriented by stretching in the longitudinal and/or in the transverse direction following the arrangement of the films in a sandwich for lamination. This may take place after the heat-bonding of said sandwich arrangement to a laminate.

Such steps are not new in themselves, see e.g. the above mentioned WO-A-9314928, but can provide particular advantages in connection with the present invention.

In the lamination process the strands in A can be directly sealed to the strands in B, but alternatively the lamination process can be extrusion lamination whereby the bonding is established by means of a separately extruded layer.

Normally the array of strands on each of the films A and B should occupy no more than 15%, preferably at the highest 10%, and more preferably at the highest 5% of the volume of the respective film A or B.

Except for the situation that there is coextruded a second (continuous) surface layer on top of the strand formed first surface layer, it will always for the sake of easy or improved lamination, be advantageous to select the composition of the strand material so that the strands, generally speaking, melt at a temperature at which the main layer still is mainly solid. Thus, the average melting point of the polymers which constitute the strand-formed first surface layer, should normally be at least about 10° C., preferably at least about 15° C., and more preferably at least about 20° C. lower than the average melting point of the polymers which constitute the main layer.

In this connection, the "average" should of course be understood as an average taking into account different weights of the constituents. Thus if the strands consist of 20% of polymer X having melting point 125° C. and 80% of polymer Y having melting point 90° C., its average melting point will be 125×20%–90×80%=97° C.

For the aspect of the invention the purpose of which is to provide a strongbond/weakbond system of lamination, and thereby a suitable combination of tear-propagation-resistance and resistance to delamination, a further advantageous embodiment should be mentioned. In this embodiment the weak bonding, which here perhaps better can be called a blocking, is established by means of a polymer addition in the second surface layer of a polymer type as used as addition in cling film. This may be referred to as an adhesion aid or a blocking agent. Such addition is a sticky polymer, e.g. polyisobutylene, normally of a relatively low molecular weight, which shows a tendency to migrate to the surface. As an example of another suitable polymer for this purpose atactic polypropylene can be mentioned. The level of this addition should of course not be so high that the sealing between this second surface layer and the strand-formed first surface layer is ruined.

Turning now to the other aspect which concerns the optical appearance, the strands inside the laminate should be colored and visible from one or both sides of the laminate. As has already been mentioned, there appears an interesting, advantageous and surprising three-dimensional optical effect when the surface of the laminate through which the strands are observed is embossed in a striated pattern. A separate embossment specifically for this purpose is not normally necessary, but can be a result of the transverse stretching between grooved rollers which today is widely used in the manufacture of crosslaminated film, see e.g. WO-A-9314928 and EP-B-0624126 (Rasmussen).

It is possible to make a crosslaminate, which has a general thickness of at the highest about 0.3 mm, appear as if the strands were at least about 0.5 mm distant from the striations. The wording general thickness is used because the striated embossment causes gauge variations. The general thickness in a span extending perpendicular to the striations should be understood as the average thickness within this span.

This embodiment of the invention is, more specified, defined as follows:
a) the laminate has a general thickness of at the highest of about 0.3 mm,
b) a film A forms one surface of the laminate,
c) the laminate surface at least on the A-side exhibits a visible pattern of striations along one direction constituted by surface corrugations with corresponding thickness variations in the film A, the divisions in said pattern being at the highest about 3 mm,
d) the thin strands are colored, and the rest of the film A is sufficiently transparent to show the colored strands when the laminate is observed from the A-side, whereby the depth of the corrugations is sufficient to give the strands the appearance of being at least about 0.5 mm distant from the striations.

Tentatively the three-dimensional effect is explained partly as a psychological illusion, and partly by the fact that the striations form an alternating arrangement of structures which very approximately can be described as cylindrical collection lenses and cylindrical spreading lenses. However, this must not be understood too strictly, since the lenses may more have the character of prisms, or there may be an alternation between lens-like segments and flat segments. The embossment may show a generally constant division, or may be more random, as when the embossments from several pairs of grooved rollers interfere with each other.

Whatever the explanation of the three-dimensional effect may be, the inventor has found this very significant as it also will appear from the example.

A particular strong optical or psychological effect of the striations can be achieved when the laminate, viewed in a cross-section perpendicular to the striations, exhibits a generally regular arrangement of ribs which are thicker than the average thickness of the laminate and have a generally concave and a generally convex surface, so that there is formed a bending of the rib transverse of its longitudinal direction, and further so that the material in or adjacent to the boundaries of the ribs, when the material is free of tension, is bent in the opposite direction to the rib to give the material between the two adjacent ribs a generally straightened-out shape. This in itself is not new, but it is a main feature in the above mentioned WO-A-9314928 (Rasmussen). In that patent the purpose of the ribs is to give the laminate essentially improved stiffness in one direction, but in connection with the present invention it also provides a particular optical effect.

Particular aesthetic effects can also be achieved when the color of the strands is formed by a pigment which supplies a metallic luster or an iridescent effect. Masterbatches for such colors are usually very expensive, but when the application is restricted to the strands this is rather unimportant, and bet the effect obtained in this way can be greater than the effect of an overall coloring of a film with such pigments.

Thus, according to an aspect of the invention, there is provided a new method of manufacturing a crosslaminate comprising mutually bonded polymer films of which at least two neighbor films A and B each are formed by coextruding in a flat or circular die a main layer of a polymer material which is selected for high tensile strength and a first surface layer from a polymer material, and in which A and B each is supplied with a uniaxial or unbalanced biaxial molecular orientation at any stage after the joining of the different materials in the coextrusion die and before the lamination, and prior to the lamination A and B are arranged in such a way that the main direction of orientation in A will cross the main direction of orientation in B, and during the lamination the bonding between A and B is established at least in part through heat, characterized in that in the coextrusion each of the said first surface layers is made discontinuous in the transverse direction, whereby it consists of an array of strands, and in the lamination the array of strands on A are arranged to cross the array of strands on B, and characterized in that the A film is provided with surface corrugations with thickness variations after its coextrusion, the divisions between the corrugations being no more than 3 mm.

Preferably the surface corrugations are provided by transverse stretching of the laminate by intermeshing grooved rollers as described in WO-A-9314928, so that the entire laminate has surface corrugations and these have the ribs described above. Preferably in this aspect the material from which the strands are extruded is colored and the material from which film A is formed sufficiently transparent to allow the strands to be visible from the A side of the laminate.

In the foregoing it was stated that commonly used machinery for manufacture of crosslaminates can be applied, only with inexpensive additions to existing coextrusion lines. This concerns the coextrusion of the array of strands, the discontinuous first bonding layer. The inventor has found that this can be done by adding special but rather simple and cheap machineparts at the exit of almost any existing design of coextrusion dies. Of course there is also need for one more extruder, but the strands will normally occupy only about 1-5% of each of the extruded films, and therefore this can be a small and inexpensive extruder. Such adapted dies are believed to be novel.

The extrusion die according to the invention is a circular extrusion die comprising a distribution part in which at least a first molten polymer material can be formed into a generally even circular flow and bodily separate from this an exit part comprising a circular main channel with generally cylindrical or conical walls, which channel may comprise a flat zone, to conduct said molten polymer material towards an exit orifice from which it will leave the die as a tubular film structure. The special feature of the invention is that said exit part also comprises a channel system for circumferential extrusion of a circular array of narrow strands of a second molten polymer material, this channel system ending in a circular row of internal orifices in the outward generally cylindrical or conical wall of the main channel.

In a preferred embodiment, the circumferential extrusion starts at one or a few inlets to the exit part and comprises for equal dividing a labyrinthine channel system starting at each inlet, each such system comprising at least three channel-branchings.

Figure 6:
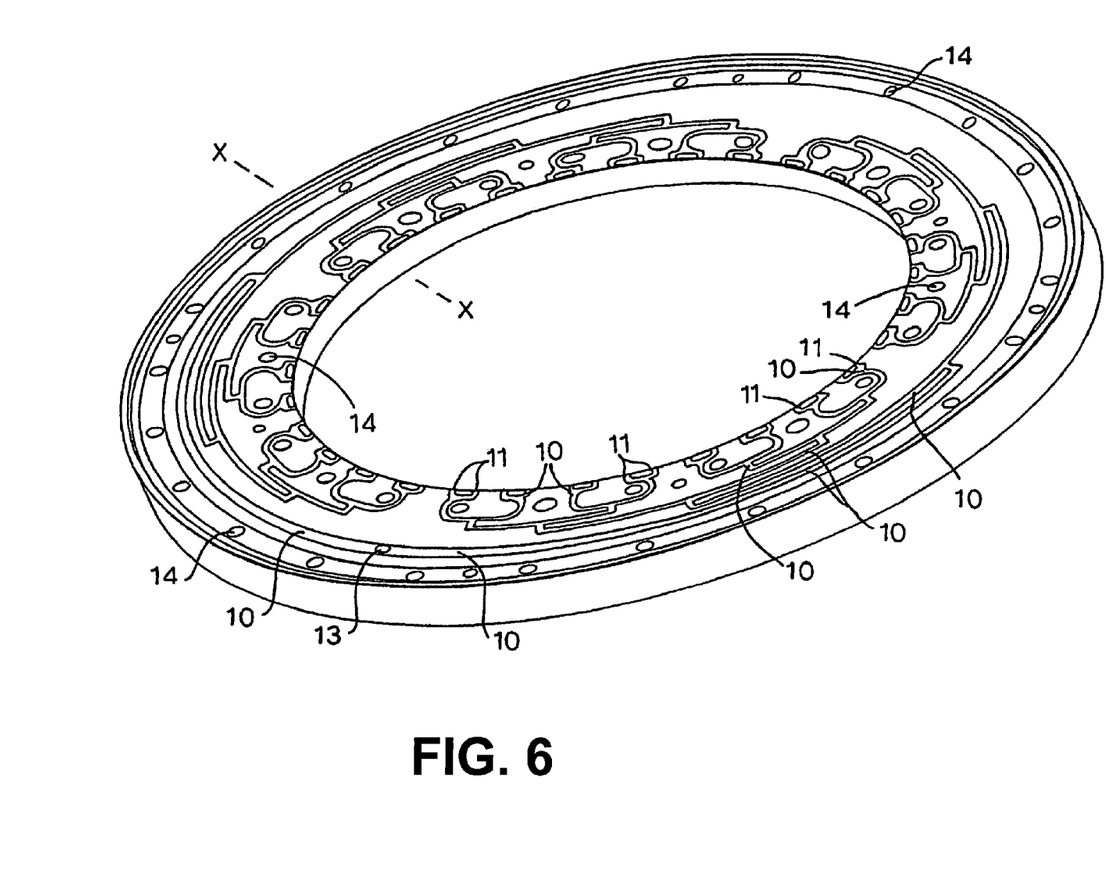
FIG. 6 is a perspective view from above of sub-part (9*a*), showing the lower half part of the labyrinthine channel system (10) by which one flow of the strand-forming material from extruder (4), fed through the inlet (13) stepwise is divided into 64 equal part-flows through the channels (10), each extruded separately through an internal orifice (11). The upper half part of the labyrinthine channel system, which is in sub-part (9*b*), is exactly symmetrical with that in FIG. 6 apart from the inlet (13).

The term labyrinthine dividing was introduced in U.S. Pat. No. 4,403,934 and refers to a dividing of flows in which one flow divides into two branches of equal length, each of these flows divide again into two branches of equal length, etc., all branches mainly being circular and parallel to each other. This is shown in FIG. 6.

n order to make a particularly short distance between the internal orifices, the channels of the labyrinthine system or systems may terminate in a common circular channel having a wall common with a part of the general cylindrical or conical wall of the main channel. The circular row of internal orifices is located in said wall part.

This coextrusion die has been conceived with a view to the manufacture of the crosslaminate as means to achieve strong bond/weak bond or strong bond/no bond lamination patterns, and for this purpose there may be a need for a continuous second bonding layer. Therefore, there is preferably in addition to the means for coextruding the said first and second molten polymer materials, provided means for coextruding a circular flow of a third molten polymer material on the side of the first material which is opposite the second material. Channel arrangements for joining the flows of first and third materials are provided either in the said distribution part, or in a part between the latter and the bodily separate exit part.

In the die, the circumference of the inward wall at the exit is preferably at least 20 cm, and the distance from middle to middle of neighbor orifices in the circular row is adapted to produce, after the magnification or reduction which will happen if the walls of the main channel are generally conical, a distance from middle to middle of neighbors of the strands which is at the highest 8 cm, preferably no higher than 4 cm and more preferably no higher than 2 cm.

The die can also advantageously be applied in the production of polymer film other than crosslaminates, for instance carrying film a decorative pattern of colored stripes. Besides the above mentioned economical advantage, namely that existing die designs can be used with addition of cheap dieparts and a small extruder, it is also an advantage that the route of flow from extruder to die exit becomes shortest possible when the inlet for the second material to the die and the entire distribution system is near the exit from the die, whereby degradation of the polymer best possible can be avoided.

For the sake of completeness it should be added that the array of strands in the coextruded films A and B for the described crosslaminate, of course also can be formed from a flow which passes through the entire distribution part of a coextrusion die parallel with other flows, but then there can be a risk of degradation since these strands as mentioned above usually only will constitute about 1-5% of each film.

There may also be two or more labyrinthine systems of the described kind, or equivalent distribution systems, one following after the other, and each ending in a circular row of internal orifices, optionally with the above-mentioned ring formed channel inserted between the final branches and the internal orifices. Preferably each such labyrinthine system should be fed from a separate small extruder. There may be used different small extruders. The internal orifices, which terminate the different labyrinthine channel systems, should be mutually displaced to avoid that the different sets of coextruded strands will cover each other. This is described below with reference to FIG. 5a.

Although, as mentioned above the various components of the production line for the laminates may be known, it is believed that the apparatus for carrying out the novel method is new.

According to a further aspect of the invention there is provided an apparatus for manufacturing a cross laminate comprising die for coextruding film A and a die for coextruding film B, the or each said die comprising a first distribution part (8) in which a first molten polymer material can be formed into a generally even flow, a second distribution part (9) in which a second molten polymer material can be formed into a flow, an exit orifice, an exit part comprising a main channel (12) to conduct said first molten polymer material towards the exit orifice and a channel system (10, 11) at one side of said main channel to conduct said flow of second molten polymer material to form a surface layer on one side of the flow of said first molten material towards the orifice, wherein the coextruded material leave the exit orifice of the die as a film structure (16);

means for orienting A and B uniaxially or unbalanced biaxially after exiting the exit orifice;

means for arranging the oriented films A and B such that the said surface layers face one another and such that their directions or main directions of orientation cross one another; and laminating means for laminating A and B by application of heat;

characterized in that the channel system for conducting the second polymer material provides a flow of said second material which is discontinuous in a direction generally transverse to the flow direction whereby each of the surface layers of A and B is formed as an array of strands and when the films A and B are arranged with their surface layers facing one another the strands on A cross the strands on B.

Where A and B are identical a single die may be part of the apparatus. This produces one film type, having the desired surface layers and arranges two films facing one another to form the laminate. The or each die is preferably a novel die as defined above.

Other features of the apparatus which are useful to carry out the novel method appear from the apparatus claims.

DETAILED DESCRIPTION OF THE DRAWINGS

Figure 1:
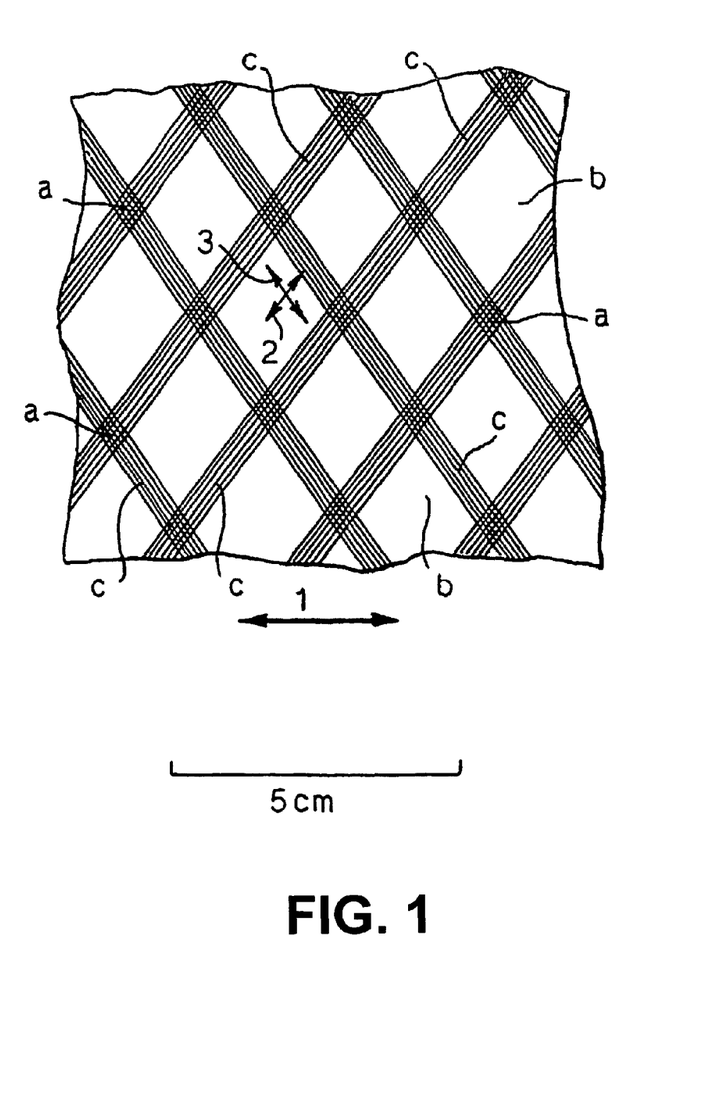
FIG. 1 is a view approximately on a true scale of the interphase between the two coextruded oriented, helical cut and cross laminated films A and B each normally but not always with a thin continuous layer for weak bonding and on top of this layer an array of strands of first bonding layer so that three different elements of bonding a, b and c are established.
Figure 2:
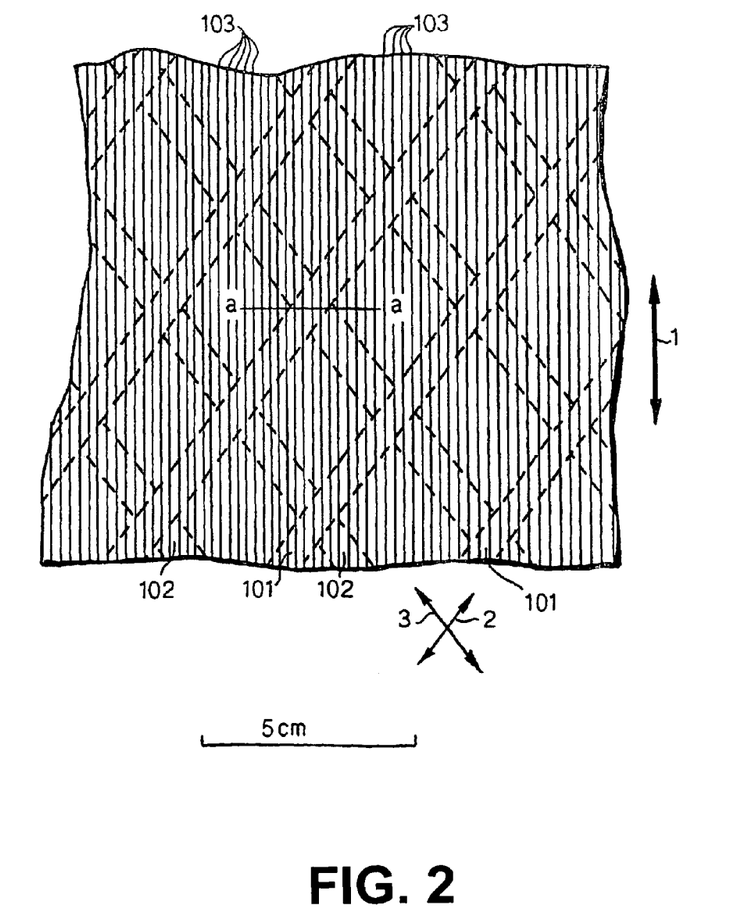
FIG. 2 is a view approximately on a true scale of two coextruded, oriented, helical cut and crosslaminated films (A and B). It illustrates the aspect of the invention which concerns the optical appearance providing a 3-dimensional effect under use of coextruded strands (101) and (102) whereby a striated embossment (103) provides a 3-dimensional effect.

In FIGS. 1 and 2 the longitudinal direction of the crosslaminated web is shown with the arrow (1). The main direction of orientation, which may be a uniaxial orientation or an unbalanced biaxial orientation, is shown by the arrow (2) for one film, and the arrow (3) for the other film. They are each shown as having an angle of about 60° to the longitudinal direction (1). This is what the inventor generally has found best for tarpaulins and cover sheet, while angles near 30° generally have been found best for cross-laminates used to make bags. An angle of 45° was only found preferable in a few cases.

For each film the main direction of orientation is shown almost but not quite parallel with the array of strands in the film. If the tubular film, when leaving the extrusion die, has been drawn-down straight, and if it has not been stretched after the helical cutting, the main direction of orientation will be exactly parallel with the array, but if the tubular film has been screwed during the drawn-down, to produce a helical melt-orientation, or if it has been uniaxially or biaxially oriented after the helical cutting, as in the above-mentioned U.S. Pat. No. 4,039,364 (Rasmussen), the main direction of orientation will not be quite parallel with the array.

In the spots (a) where one array crosses the other one, there is established a strong spot-welding. The bonding should normally be so strong that the laminate will rupture around these spots if delamination is tried.

If there is not coextruded a continuous second bonding layer between the strand and the main layer, there will only be bonding in the spots (a), but as mentioned this will be a very strong bonding. As it has been explained in the general description, this simple bonding system is preferable in some cases. However, the coextrusion die should preferably comprise a channel system for the second bonding layer even though its use is not limited to the said cases.

Most normally there should be coextruded a second bonding layer in each film between main layer and the array of strands. In the areas marked (b) there is direct adhesive connection between the second bonding layers in the two films, and by the choice of material composition and laminating temperature there is established a predetermined, well controlled weak bonding here.

In the areas (c) the strands on one film are adhesively connected with the second bonding layer on the other film. Thus the bonding strength in areas (c) has a value somewhere between those in (a) and those in (b). There is a wide choice between these three values, and the adhesives system can so to say be tailor-made for the intended use of the cross-laminate.

With relatively thin film it is possible to make the bonding in the (c) areas so strong that it cannot be eliminated without rupture of the material, even when the bonding in the (b) areas is made particularly weak. Hereby these areas of weak bonding are fully "encased" in areas of strong bonding. The advantages of this for certain uses are explained in the general description. In other cases, it can be preferable, still while making the bonding in the (b) areas very weak, to give the bonding in the (c) areas a suitable value between that of (a) and (b) which allows delamination during tear propagation, but exerts such as high resistance against this delamination, that tear energy is absorbed and rupture around the (a) spots is prevented.

In FIG. 2 the machine direction of the crosslaminated web is shown with the arrow (1). The main direction of orientation, which here is considered an unbalanced biaxial orientation, is shown by the arrow (2) for one film, and the arrow (3) for the other film. They are each shown at an angle of about 30° to the machine direction (1).

For each film the main direction of orientation is shown almost but not quite parallel with the array of strands (101) in film A and (102) in film B. These strands are in FIG. 2 shown by thick interrupted lines.

Figure 3:
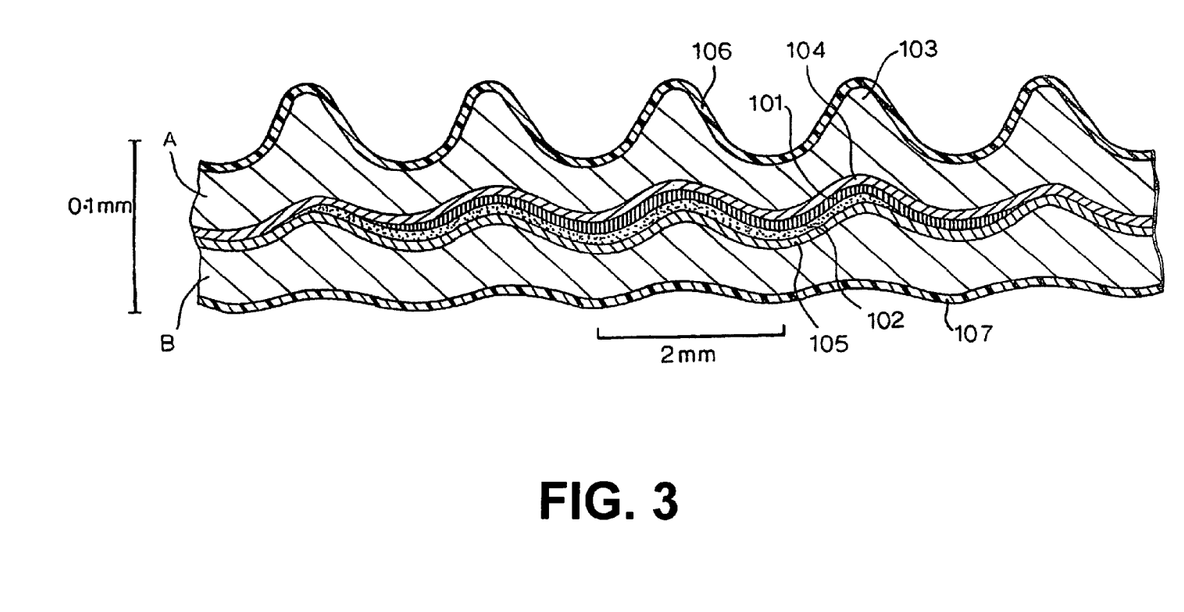
FIG. 3 shows a section through a-a in FIG. 2. This section is perpendicular to the striations. The thickness of each layer is here shown in about 400 times magnification, while the dimensions parallel to the surfaces of the laminate are shown in about 20 times magnification.
Figure 4:
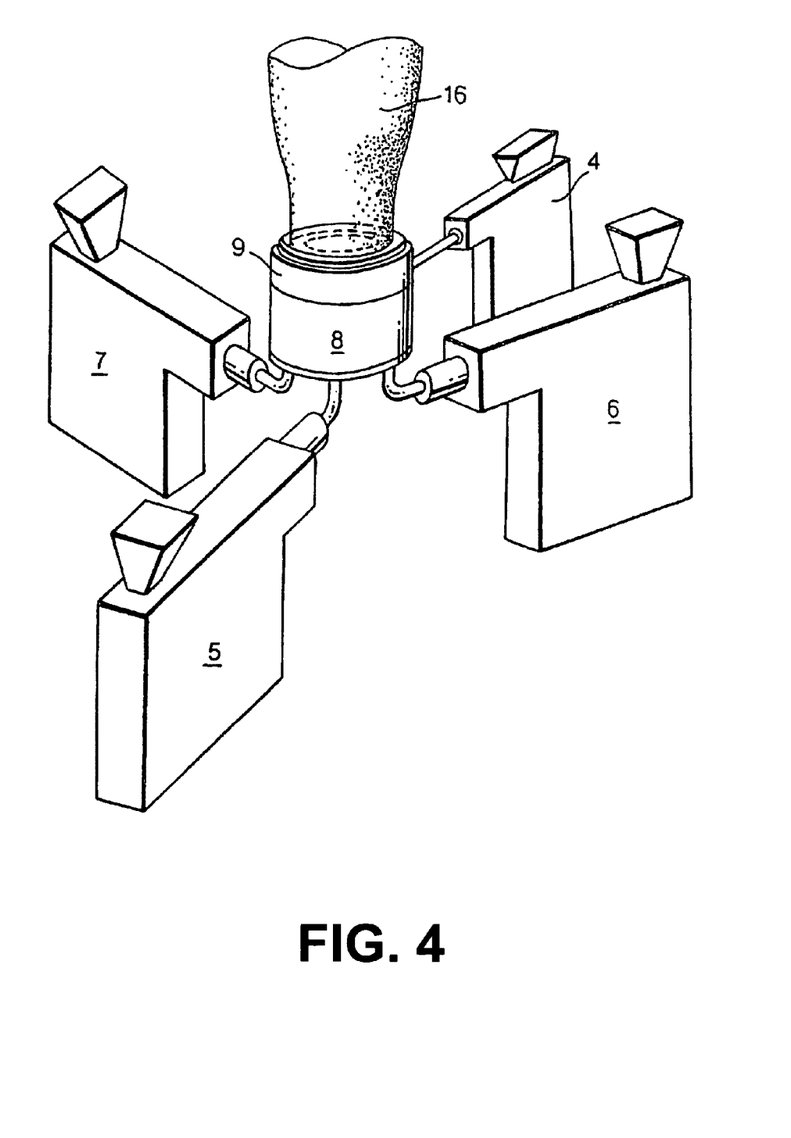

Note that in FIG. 2 the lines (103) are not hatching, but represent the striations formed by embossment, which appear in cross-section from FIG. 3. This embossment is produced by stretching between grooved rollers, see the example. Due to this striation, the colored strands (101) and (102) appear to be pronouncedly distant from the striations, even when the real distance is about equal to or even smaller than the resolution of the eye (which is about 0.1 mm). As already mentioned it is believed that this illusion is connected with the fact that the surface on the laminate in an alternating arrangement is concave and convex, or in other words, the film A, which here is considered transparent, consists of many fine cylindrical collecting lenses alternating with fine cylindrical spreading lenses. It may also play a role that the pressure exerted by the grooved rollers provides a pattern of varying shininess. The film B may likewise be transparent, but may also be deeply colored to form an aesthetic background for the pattern of colored striations.

FIG. 3 further shows second surface layers (104) and (105) for control of bonding strength, and laminate surface layers (106) and (107), made of polymer materials which are selected to improve the heat-seal properties and/or the frictional properties of the laminate. In case the invention should be used not only for achievement of the optical effects, but also to establish as strongbond/weakbond pattern—this is normally the case, the second surface layers should be between the respective strand-formed first surface layer (101) or (102) and the respective main layer (108) or (109), as it is shown here, and as it further is explained in the general description.

However, if a strongbond/weakbond effect is not required, each strand-formed first surface layer (101), or (102) can be coextruded between the main layer (108) or (109) and the bonding controlling second surface layer (104) or (105).

The cross-section shown in FIG. 3a is drawn on basis of a microphoto of the laminate described in example 2. As already mentioned it is believed that the 3-dimensional effect, which makes the colored strands appear much more distant from the striations than they really are, is a result, at least in part, of the alternating arrangement of the "cylindrical collecting lenses" and "cylindrical spreading lenses" which constitute the striations.

Figure 5A:
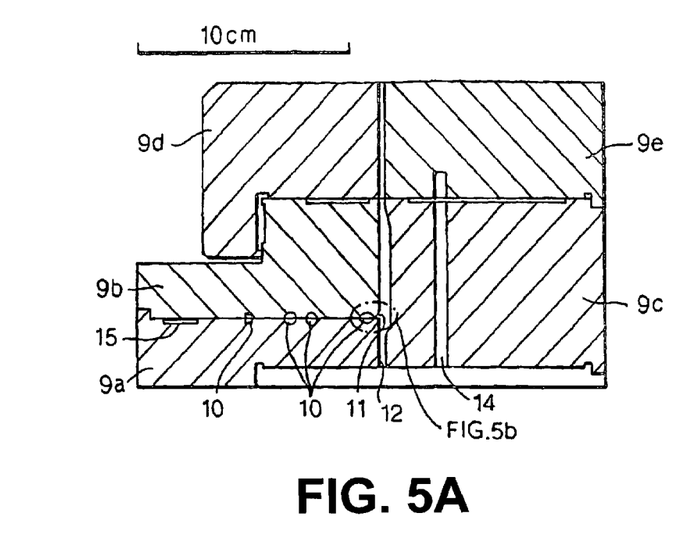
FIG. 5*a* is an axial section, shown on about half scale, of the bodily separate exit part (9), which consists of the sub-parts (9*a*), (9*b*), (9*c*), (9*d*) and (9*e*). The section goes through the line x-x in FIG. 6. Several channels (10) of the labyrinthine system are shown.
Figure 5B:
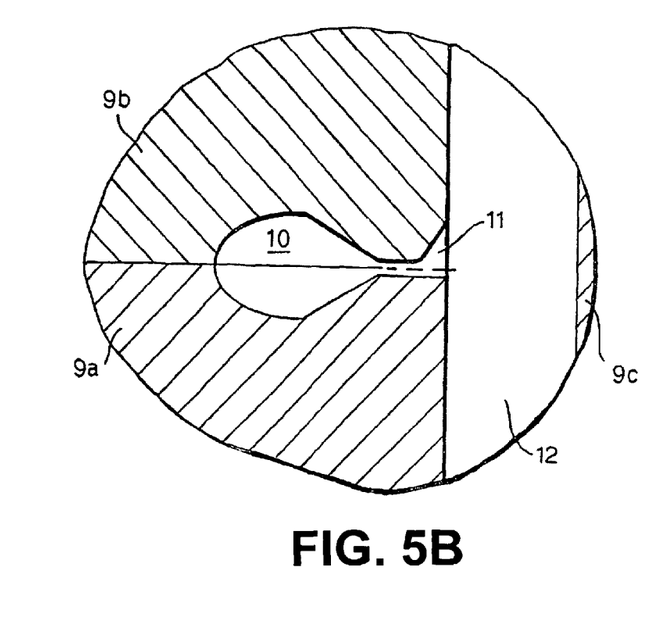
FIG. 5*b* is a detail from FIG. 5*a* showing the last branch in the labyrinthine channel system and one of the 64 internal orifices (11) through which the flows of strand-forming material join the tubular flow (12) of the three other coextruded materials. This detail is drawn on a scale about six times true scale.

FIGS. 4, 5a, 5b and 6 have already been sufficiently described for a principal understanding, but the following should be added:

Different rows of bores (14) for bolts or screws keep the parts strongly together. In FIG. 5a a shallow channel (15) for drainage is included, as usual in die construction. In fact there should be a system of channels for drainage occupying most of the area between sub-parts (9a) and (9b), but for the sake of clarity only this channel is shown. With reference to FIG. 5b the downstream side of the internal orifices (11) is given a shape which prevents damage of the axial flow, which can otherwise occur if there had been a sharp edge on this side of the orifices.

It has been emphasised that there is an exit part (9) bodily separate from the distribution part (8). As shown diepart (9) will normally consist of several sub-parts. The shown sub-parts (9c) and (9e) can be constructed as one part. The centering of sub-part (9d) is made adjustable in order to compensate for thickness variations in the extruded tubular film (16).

Where two or more labyrinthine systems are used, each fed from separate extruders, there can be inserted a further die ring between rings (9a) and (9b), the surfaces of this inserted ring being shaped so that, together with (9a) it forms one labyrinthine system, and together with (9b) it forms another labyrinthine system.

In FIG. 6 each of the final 64 branches of the labyrinthine system ends in an internal orifice which extrudes directly into the axial tubular stream. However it is not practical to divide into more than 64 branches, and if a bigger number of strands is wanted, each final branch may open into a common ring-formed channel close to the channel (12) for the axial flow. From this ring-formed channel there can be the desired big number of openings into channel (12).

EXAMPLE 1

The procedure is the same as in U.S. Pat. No. 5,028,289 (Rasmussen) example 3 except for the following:

The coextrusion line is constructed as shown in FIGS. 4, 5a, 5b and 6, and there are coextruded strands consisting of a low-melting metallocene-catalysed copolymer of ethylene and octene having melting range 50-60° C. and melt flow index 1.0.

To this is added a masterbatch of silver pigment. The amount of this addition is three times that used in normal extrusion of silver effect film.

The layer which in said US patent is called lamination layer and here second bonding layer is a blend of 90% LLDPE and 10% of the low melting copolymer. The LLDPE has density 0.92 g ml$^{-1}$ and melt flow index 1.0. The main layer and the heat-seal layer (for heat-sealing of the final cross-laminate) are the same as in the said example 3. The main layer forms 75%, the heat-seal layer 15%, the second bonding layer 8%, and the strands 2% of the film by volume.

The components for the main, second bonding and heat-seal layers do not contain any pigment.

The angle of cutting is 57°.

The temperature for lamination, stretching processes, and final heat treatment are also different, namely:

For pre-heating: 60° C.

For the transverse stretching between the special grooved rollers described in the said US patent and the first longitudinal stretching process: 50° C.

For the following transverse and longitudinal stretching processes: 35° C.

For the heat treatment which effects the final bonding: 90° C. Furthermore, no air jet is used to cool the films during the main transverse stretching.

As in the said example 3, the gauge of the final cross-laminate, which for identification below is called I, is about 70 g m$^{-2}$. This has the bonding pattern shown in FIG. 1.

A similar cross-laminate (called II) but without the strands, is manufactured for comparison.

Furthermore there is manufactured a third laminate (called III) similarly to I, but without the strands and with 15% instead of the 10% low melting copolymer in the second bonding layer.

Sample (I) exhibits the highest tear propagation resistance, sample (II) almost the same, and laminate (III) a considerably lower tear-propagation resistance under shock-tearing, unacceptable for tarpaulins. This property is evaluated by hand-tearing at a measured velocity between 5-7 m s$^{-1}$ by a team of people used to such testing and knowing the requirements of customers. To the knowledge of the inventor there does not exist any standardised test for tear-propagation-resistance which come close to the practical conditions of tearing.

Laminates (I), (II) and (III) are also tested in an accelerated aging by flexing. The laminates are cut into 8 cm wide bands which each are set up like a flag on a stick of diameter 25 mm and cut so that it extends 25 cm from the pole. The flag is then tested by an artificial wind of about 100 km h$^{-1}$. Samples (II) and (III) delaminated within a few minutes, while sample (I), for the 2 hour period which the test lasted, remained bonded in all spots where the strands intersected each other.

The following refers to examinations before the described accelerated flexing treatment. When sample (I) is looked at, no matter from which side, it gives the impression that the colored strands are a few mm distant from the striations.

The cross-section of sample (I) is examined in microscope. It exhibits a regular pattern of thickness variations and a corresponding waving, however to a very small extent. In example 1 of the above-mentioned EP-B-0624126 this structure, which there is called "U-Rib Structure" is produced much more pronouncedly, see FIG. 1 of that patent. The "U-Rib Structure" is characterized in that the second surface layer is between the main layer and the first surface layer and is selected to produce, at locations (b) which are devoid of any first bonding layer, a bonding of lower strength than the bonding in the spots (1) where strands on A intersect strands on B. In the present example the objective has been to form "U-Rib Structure" much less pronouncedly by modified process conditions, namely the bigger angle of cutting, the milder conditions of cooling after the longitudinal stretching, and a slightly higher transverse tension during the annealing.

The thickness of sample I varies by about ±10% in a generally regular pattern, while the angle between the surface referred to as A and the average plane of the surface varies by about ±3°. within a division, also in a generally regular pattern. Due to the influence on the reflection of light, these relatively small variations of angle give the impression of a pronounced striation. It may also play a role that the grooved stretching rollers have impressed a pattern of varying shininess.

EXAMPLE 2

The aim of this example is a further study of optical effects of the criss-crossing strands, before and after accelerated aging by flexing.

The procedure of example 1 is exactly followed, except for pigmenting of the components.

Sample IV: The strands have the same silver effect pigment addition as in example 1. In one ply of the laminate the main layer is pigmented with a deep blue color, using an amount of masterbatch which is about double of that normally used. In the other ply of the laminate only the strands are pigmented, the rest transparent.

Sample V: The strands are pigmented white by a masterbatch with $TiO_2$. The amount of masterbatch is three times that normally used.

In both plies of the laminate the main layer is pigmented with the same blue pigment as sample IV, but with half the amount of masterbatch.

Sample VI: No strands, the main layers pigmented like in sample V. Same second bonding layer as in samples IV and V.

Examination of the samples before the accelerated aging by flexing tests:

Sample IV: Viewed from the transparent side a brilliant, 3-dimensional silver pattern. Viewed from the "reverse" side: a quite aesthetic but not brilliant 3-dimensional pattern of lines in a darker blue color.

Sample V: Viewed from either side an aesthetic 3-dimensional pattern of lines in a lighter blue color.

Examination of the sample after 5 minutes accelerated flexing as explained in example 1:

Sample IV: From the "reverse" side it still looks aesthetic and there are no signs of delamination in the areas where there is strand material. From the transparent side it now looks much less aesthetic due to the progressed delamination in the areas where there is no strand material.

Sample V: From both sides the laminate looks somewhat aged, but the crisscrossing pattern is still intact all over and still has an aesthetic effect.

Sample VI (without any strands): Heavily delaminated and useless.

Examination of sample V after 1 hour accelerated flexing as explained in example 1: The material still is spot-bonded in all spots where the strands intersect. On both sides it shows a linear pattern in lighter color.

EXAMPLE 3

The procedure of example 1 is repeated with the modification that the films are extruded thicker, to give the final laminate a weight of 120 g m$^{-2}$, and in the second bonding layer the contents of the low melting copolymer is increased from 10% to 15%.

The pigmentation is like in example 2, sample IV, namely: strands silver, main layer in one ply deep blue, and in the other ply without any pigment.

This crosslaminate shows excellent tear propagation properties, evaluated as explained in example 1. After 5 minutes accelerated flexing by the method used in examples 1 and 2 it still shows no sign of delamination.

Therefore the three-dimensional pattern still looks brilliant from the transparent side also after this treatment.

The invention claimed is:

1. A cross-laminate comprising:
 a first coextruded film A having a film A main direction of uniaxial or unbalanced biaxial molecular orientation and including:
  a continuous main layer comprising a first polymer material selected to have a high tensile strength,
  a continuous bonding layer comprising a second polymer material and disposed on a first surface of the main layer, and
  an array of substantially parallel film A first strands coextruded on a top surface of the bonding layer in a spaced apart configuration, and comprising a third polymer material different from the first and second polymer materials, where a separation between adjacent strands of film A array is between 2 mm and 8 cm measured from a middle of one strand to a middle of an adjacent strand,
 a second coextruded film B having a film B main direction of uniaxial or unbalanced biaxial molecular orientation and including:
  a continuous main layer comprising a fourth polymer material selected to have a high tensile strength,
  a continuous bonding layer comprising a fifth polymer material and disposed on a first surface of the main layer, and
  an array of substantially parallel film B first strands coextruded on a top surface of the bonding layer in a spaced apart configuration, and comprising a sixth polymer material different from the fourth and fifth polymer materials, where a separation between adjacent strands of film B array is between 2 mm and 8 cm measured from a middle of one strand to a middle of an adjacent strand,
  where the film A and the film B are arranged such that the first surface of the film A faces the first surface of the film B and their bonding layers and arrays of strands on the first surfaces face each other and such that the film B main direction crosses the film A main direction and the array of the film B first strands cross the array of the film A first strands, a first bonding pattern formed between the first surface of the film A and the first surface of the film B comprising:
first bonds comprising spot-bonds formed directly between the film A first strands and the film B first strands, where the film A first strands intersect the film B first strands,
second bonds comprising contact lines between the film A bonding layer and the film B first strands or the film B bonding layer and the film A first strands, and
third bonds comprising contact regions between the film A bonding layer and the film B bonding layer, where the regions are devoid of the film A first strands and the film B first strands,
where the first bonds have a higher bond strength than a bond strength of the third bonds, and
where the strands have a thickness of no more than 30% of a thickness of their respective films at their thickest.

2. The cross-laminate according to claim 1, further comprising:
an exterior layer formed on an exterior surface of at least the film B comprising an exterior layer polymer material enhances a surface property of the laminate, where the property is selected from the group consisting of its heat-sealing capability and its frictional property.

3. The cross-laminate according to claim 1, wherein the second bonds have a bond strength greater than the bond strength of the third bonds.

4. The cross-laminate according to claim 1, wherein a collective area of the film A first strands and the film B first strands comprises no more than 60% of a surface area of their respective film sides.

5. The cross-laminate according to claim 1, wherein a thickness increase of the films A and B at their respective strand locations is at most 20% of a film thickness of the films A and B in adjacent regions of the films A and B devoid of their respective strands.

6. The cross-laminate according to claim 1, wherein a thickness increase of the films A and B at their respective strand locations is at most 10% of a film thickness of the films A and B in adjacent regions of the films A and B devoid of their respective strands.

7. The cross-laminate according to claim 1, wherein a volume of the film A strands and the film B strands is not greater than 15% of a volume of their respective films.

8. The cross-laminate according to claim 1, wherein a volume of the film A strands and the film B strands is not greater than 10% of a volume of their respective films.

9. The cross-laminate according to claim 1, wherein a volume of the film A strands and the film B strands is not greater than 5% of a volume of their respective films.

10. The cross-laminate according to claim 1, wherein the separation is between 2 mm and 40 mm.

11. The cross-laminate according to claim 1, wherein the separation is at the highest 20 mm.

12. The cross-laminate according to claim 1, wherein:
the bond strength of the first bonds is at least 40 g cm$^{-1}$, as measured by a peel test carried out on narrow specimens of the cross-laminate at a velocity of about 1 mm sec$^{-1}$, and
the bond strength of the third bonds are less than or equal to 75% of the bond strength of the first bonds, as measured by the peel test.

13. The cross-laminate according to claim 12, wherein the bond strength of the third bonds are less than or equal to 50% of the bond strength of the first bonds, as measured by the peel test.

14. The cross-laminate according to claim 1, wherein an average melting point of the third polymer material and average melting point of the sixth polymer materials are at least about 10° C. lower than an average melting point of the first polymer material and an average melting point of the fourth polymer material.

15. The cross-laminate according to claim 1, wherein an average melting point of the third polymer material and average melting point of the sixth polymer materials are at least about 15° C. lower than an average melting point of the first polymer material and an average melting point of the fourth polymer material.

16. The cross-laminate according to claim 1, wherein an average melting point of the third polymer material and average melting point of the sixth polymer materials are at least about 20° C. lower than an average melting point of the first polymer material and an average melting point of the fourth polymer material.

17. The cross-laminate according to claim 1, wherein the main layer of each of the two films A and B consists essentially of polyethylene or polypropylene.

18. The cross-laminate according to claim 1, wherein:
the main layers are selected from the group consisting of HDPE, LLDPE or a blend of the two, and
the bonding layers comprise LLDPE in admixture with 5-25% of a copolymer of ethylene having a melting point or a melting range within the temperature range of 50-80° C.

19. The cross-laminate according to claim 1, wherein the bonding layers include an adhesion modifying material that establishes a blocking of the contacting mutually facing surfaces of the films A and B to each other in regions devoid the their strands.

20. The cross-laminate according to claim 1, wherein:
at least one of the films A and B includes a second array of substantially parallel second strands,
where the second strands comprise a polymer material differing in composition, color and/or appearance from the first strands.

21. The cross-laminate according to claim 1, wherein the polymer material of the strands of at least one of the films A and B includes a colored material that makes the colored strands visible through at least one side of the cross-laminate.

22. The cross-laminate according to claim 21, wherein the cross-laminate has a thickness at its highest of about 0.3 mm, and:
wherein an exterior surface of the film A is corrugated to form a visible pattern of striations extending in one direction,
where a spacing of the striations being at most about 3 mm,
the main layer and the bonding layer of the film A are substantially transparent to enable the colored strands to be visible when the laminate is observed from one of the exterior surfaces of the cross-laminate, and
a depth of the corrugations is sufficient to impart a three-dimensional effect to the cross-laminate such that the strands appear to be spaced internally from the exterior surface of the film A a distance substantially greater than an actual maximum thickness of the film A.

23. The cross-laminate according to claim 1, wherein the film A further includes:

a second continuous bonding layer comprising an seventh polymer material and disposed on a second surface of the main layer, and an array of substantially parallel film A third strands coextruded on a top surface of the second bonding layer in a spaced apart configuration and comprising an eighth polymer material different from the first polymer material and seventh polymer material, and the cross-laminate further comprising:

a third film C having a main direction of uniaxial or unbalanced biaxial molecular orientation and including:

a continuous main layer comprising a ninth polymer material having a high tensile strength, a continuous bonding layer comprising a tenth polymer material and disposed on a first surface of the main layer, and an array of substantially parallel film C first strands disposed on a top surface of the bonding layer in a spaced apart configuration and comprising an eleventh polymer material different from the ninth and tenth polymer materials, where the film A and the film C are arranged such that the second surface of the film A faces the first surface of the film C and the second bonding layer of the film A and the bonding layer of film C and the array of third strands of the film A and the array of strands of the film C face each other and such that the film C main direction crosses the film A main direction and the film C first strands cross the film A third stands, a second bonding pattern formed between the second surface of the film A and first surface of the film C comprising:

fourth bonds comprising spot-bonds formed directly between the film A third strands and the film C first strands, where the film A first strands intersect the film C first strands, fifth bonds comprising contact lines between the film A bonding layer and the film C first strands or the film C bonding layer and the film A third strands, and sixth bonds comprising contact regions between the film A bonding layer and the film C bonding layer, where the regions are devoid of the film A third strands and the film C first strands, where the fourth bonds have a higher bond strength than the sixth bonds.

24. The cross-laminate according to claim 23, further comprising:

an exterior layer formed on an exterior surface of at least the film B or the film C comprising a polymer material that enhances a surface property of the laminate, where the property is selected from the group consisting of its heat-sealing capability and its frictional property.

* * * * *